March 21, 1950 M. J. SMITH 2,501,104
COMBINATION GRILL AND GRID
Filed Jan. 10, 1947 2 Sheets-Sheet 2
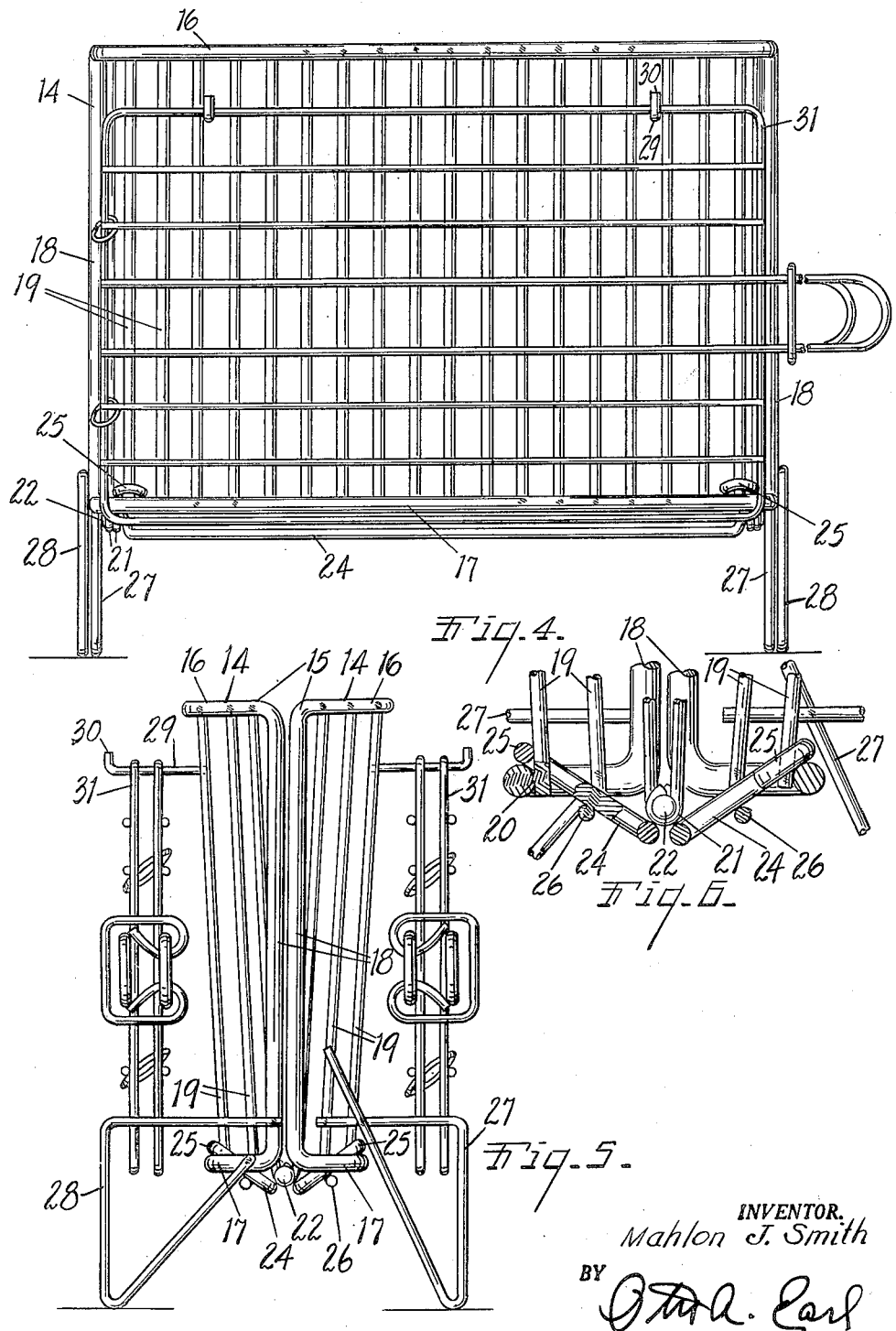
INVENTOR.
Mahlon J. Smith
BY
ATTORNEY.

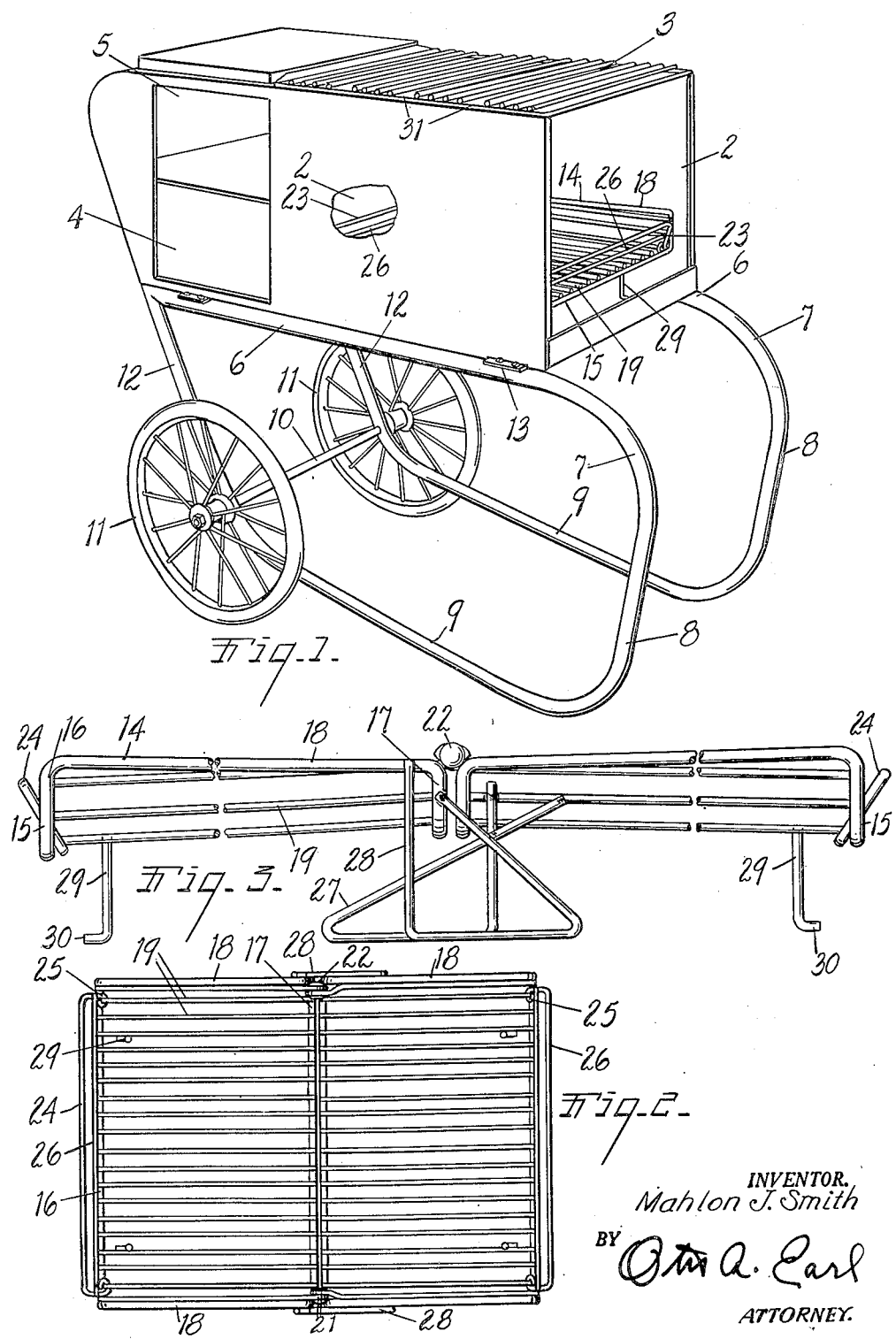
March 21, 1950 — M. J. SMITH — 2,501,104
COMBINATION GRILL AND GRID
Filed Jan. 10, 1947 — 2 Sheets-Sheet 1
INVENTOR.
Mahlon J. Smith
BY Otis A. Earl
ATTORNEY.

Patented Mar. 21, 1950

2,501,104

UNITED STATES PATENT OFFICE 2,501,104

COMBINATION GRILL AND GRID

Mahlon J. Smith, Niles, Mich., assignor to Michigan Wire Goods Company, Niles, Mich.

Application January 10, 1947, Serial No. 721,398

14 Claims. (Cl. 99—449)

This invention relates to improvements in a combination grill and grate.

The main objects of this invention are:

First to provide a combination grill and grate or grid which may be quickly adjusted for either purpose and at the same time is strong and durable.

Second, to provide a structure of this character formed of wire or light rod and which is light in weight, several parts being disposed so that they coact and support each other.

Third, to provide a grill structure having these advantages which is highly efficient.

Fourth, to provide a portable stove structure with which the grill or grate may be efficiently used.

Objects relating to details and economies of the invention will appear from the description to follow. The invention is defined and pointed out in the claims.

A structure which embodies the features of the invention is illustrated in the accompanying drawings, in which:

Fig. 1 is a perspective view of a portable outdoor stove embodying my invention with the combined grill and grate adjusted as a grate and in position in the fire box of the stove.

Fig. 2 is a plan view of the combined grill and grate adjusted as a grate or grill or grid.

Fig. 3 is an enlarged fragmentary side elevation of the combined grid and grate structure adjusted as a grate or grid.

Fig. 4 is an end elevation of the combined grill and grate adjusted as a fuel basket with a grill mounted in position thereon, the handle of the grill being partially broken away.

Fig. 5 is an elevational view looking from the right of Fig. 4 with two grills in position.

Fig. 6 is an enlarged fragmentary view partially in vertical section showing further details of the structure and relation of the parts when adjusted to an upright position.

The stove of my invention illustrated in Fig. 1 comprises a sheet metal body designated generally by the numeral 1 and having a combustion chamber 2 open at one end and having grid bars 3 across the top thereof. This combustion chamber is adapted to receive the combined grill and grate when it is adjusted to its horizontal position as illustrated in the drawings in Figs. 1, 2 and 3 in which position fuel may be arranged thereon to supply heat to objects arranged on the grid bars 3. The rear of the body 1 is provided with compartments 4 and 5 which open at the side of the body 1 and are adapted to receive food or dishes, these compartments being effective as warming ovens when there is a fire in the combustion chamber.

The body 1 is mounted on a frame comprising side bars 6 which are extended into handles 7, the handles being extended into legs 8 which are in turn extended into runner-like base members 9 mounted at their rear ends on the axle 10 provided with wheels 11. The rear ends of the base members are extended upwardly at 12 and joined to the rear ends of the side bars 6. These parts are desirably formed of tubing. The stove body is provided with brackets 13 secured to the side bars.

The combination grill or grate or grid element of my invention comprises a pair of body members designated generally by the numerals 14 of channel section and comprising frames 15 having U-shaped outer and inner members 16 and 17, the arms of which are connected by side members 18. These frame members are formed of light rod or fairly heavy gage wire. Spaced wire slats 19 are welded as indicated at 20 to the inner sides of the body frame end members. Opposed pairs of these slats are extended at their inner ends and conformed into eyes 21 to receive the pivots 22 whereby the body members are pivotally connected to be swung to an upright position as shown in Figs. 4, 5 and 6 or to a horizontal position as shown in Figs. 1, 2 and 3. Each body member is provided with an adjustable cross or transverse member designated generally by the numeral 23 and comprising a U-shaped member 24, the arms of which terminate in eyes 25 slidably embracing certain of the slats. A slat 26 is secured to the arms of the transverse member so that when the body members are swung to erected position these transverse members swing or slide to the bottom and provide a bottom for the fuel basket resulting from thus positioning the body members. The transverse members 23 may be adjusted to the outer ends of the body members as shown in Fig. 2 or to any desired intermediate position to constitute ends for the grate or grid and thus provide a grid or grate of the desired capacity.

Legs 27 and 28 are provided, these legs being formed of wire and projecting downwardly when the structure is adjusted as a fuel basket and extending laterally to provide a base of substantial width so that the parts are held in their upright position. The legs are laterally offset relative to each other so that they may be swung into overlapping position as shown in Fig. 3, in which position they constitute supporting legs for the inner ends of the body members.

Arms 29 are provided preferably having laterally turned outer ends 30, these arms constituting legs when the structure is adjusted as a grate or grid and as supporting arms for the grills designated generally by the numeral 31. These grills are designed to receive steaks or other food to be cooked or toasted and the grills are suspended at the sides of the structure when it is adjusted as a fuel basket and grill support. It is desirable to use charcoal as a fuel as it is easily ignited and produces a relatively large amount of heat.

The grill is adjusted as a grate and placed in the combustion chamber. It may be used as a grid when adjusted to horizontal position and supported over the fuel bed or the fuel arranged thereunder. The combined grill and grate or grid are well adapted for use with the stove structure illustrated or independently thereof.

The cross pieces or bars of the top grid 3 are arranged to provide spaces 31 of substantial width so that fuel, for example charcoal briquettes, may be dropped through these openings or through the spaces into the fuel basket or grate.

Having thus described my invention, what I claim as new and desire to secure by Letters Patent, is:

1. In a combined grill and grate or grid the combination of a pair of body members of channel section comprising frames having U-shaped inner and outer end members and side members integrally connected to the arms thereof, spaced wire slats welded to the inner sides of the frame end members, opposed pairs of the slats being extended at their inner ends and conformed to provide eyes which pivotally connect permitting the body members being adjusted to facing upright relation to constitute walls of a fuel basket or to an aligned horizontal position to constitute a grate or grid, adjustable cross members slidably mounted on certain of the slats to be positioned at the inner ends of the body members to constitute bottom members when the body members are adjusted to upright position or to be positioned at the outer ends of the body members to constitute end members when the body members are adjusted to a horizontal position, legs mounted at the inner ends of said body members and extending downwardly therefrom in laterally offset relation thereto to provide a relatively wide base when the body members are in upright position, the legs also constituting supporting legs for the inner ends of the body members when they are adjusted to a horizontal position, the adjacent legs being offset relative to each other to permit them to overlap when the body members are adjusted to horizontal position, and grill supporting arms secured to certain of the slats to project laterally therefrom for supporting grills at the sides thereof when the body members are adjusted to upright position, said arms constituting legs when the body members are adjusted to horizontal position.

2. In a combined grill and grate or grid the combination of a pair of body members of channel section comprising frames having U-shaped inner and outer end members and side members integrally connected to the arms thereof, spaced wire slats welded to the inner sides of the frame end members, said body members being pivotally connected to permit their adjustment to facing upright relation to constitute walls of a fuel basket or to an aligned horizontal position to constitute a grate or grid, adjustable cross members mounted on said body members to be positioned at the inner ends of the body members to constitute bottom members when the body members are adjusted to upright position or to be positioned on the body members to constitute end members when the body members are adjusted to a horizontal position, legs mounted at the inner ends of said body members and extending downwardly therefrom in laterally offset relation thereto to provide a relatively wide base when the body members are in upright position, the legs also constituting supporting legs for the inner ends of the body members when they are adjusted to a horizontal position, and grill supporting arms secured to certain of the slats to project laterally therefrom for supporting grills at the sides thereof when the body members are adjusted to upright position, said arms constituting legs when the body members are adjusted to horizontal position.

3. In a combined grill and grate or grid the combination of a pair of body members of channel section comprising frames having U-shaped inner and outer end members and side members integrally connected to the arms thereof, spaced wire slats welded to the inner sides of the frame end members, said body members being pivotally connected to permit their adjustment to facing upright relation to constitute walls of a fuel basket or to an aligned horizontal position to constitute a grate or grid, legs mounted at the inner ends of said body members to support them in upright position, the legs also constituting supporting legs for the inner ends of the body members when they are adjusted to a horizontal position, and grill supporting arms secured to certain of the slats to project laterally therefrom for supporting grills at the sides thereof when the body members are adjusted to upright position, said arms constituting legs when the body members are adjusted to horizontal position.

4. In a combined grill and grate or grid the combination of a pair of body members of channel section comprising frames having U-shaped inner and outer end members and side members integrally connected to the arms thereof, spaced wire slats welded to the inner sides of the frame end members, said body members being pivotally connected to permit their adjustment to facing upright relation to constitute walls of a fuel basket or to an aligned horizontal position to constitute a grate or grid, and legs mounted at the inner ends of said body members to support them in upright position, the legs also constituting supporting legs for the inner ends of the body members when they are adjusted to a horizontal position.

5. In a combined grill and grate or grid the combination of a pair of trough shaped body members having grid-like walls, said body members being hingedly connected at their inner ends to permit their being adjusted to facing upright relation to constitute a fuel basket or to an aligned horizontal position to constitute a grate or grid, adjustable transverse members mounted on said body members to be positioned at the inner ends of the body members to constitute fuel basket bottom members when the body members are adjusted to upright position or to be positioned on the body members to constitute end members when the body members are adjusted to a horizontal position, legs at the inner ends of said body members and extending downwardly therefrom in laterally offset relation 2,501,104 thereto to provide a relatively wide base when the body members are in upright position, the legs also constituting supporting legs for the inner ends of the body members when they are adjusted to a horizontal position, the adjacent legs being offset relative to each other to permit them to overlap when the body members are adjusted to horizontal position, and grill supporting arms secured to the body members to project laterally therefrom for supporting grills at the sides thereof when the body members are adjusted to upright position, said arms constituting legs when the body members are adjusted to horizontal position.

6. In a combined grill and grate or grid the combination of a pair of trough shaped body members having grid-like walls, said body members being hingedly connected at their inner ends to permit their being adjusted to facing upright relation to constitute a fuel basket or to an aligned horizontal position to constitute a grate or grid, adjustable transverse members mounted on said body members to be positioned at the inner ends of the body members to constitute fuel basket bottom members when the body members are adjusted to upright position or to be positioned on the body members to constitute end members when the body members are adjusted to a horizontal position, legs at the inner ends of said body members to support them in upright or in horizontal position, and grill supporting arms secured to the body members to project laterally therefrom for supporting grills at the sides thereof when the body members are adjusted to upright position, said arms constituting legs when the body members are adjusted to horizontal position.

7. In a combined grill and grate or grid the combination of a pair of trough shaped body members having grid-like walls, said body members being hingedly connected at their inner ends to permit their being adjusted to facing upright relation to constitute a fuel basket or to an aligned horizontal position to constitute a grate or grid, adjustable transverse members mounted on said body members to be positioned at the inner ends of the body members to constitute fuel basket bottom members when the body members are adjusted to upright position or to be positioned on the body members to constitute end members when the body members are adjusted to a horizontal position, and legs at the inner ends of said body members and extending downwardly therefrom in laterally offset relation thereto to provide a relatively wide base when the body members are in upright position, the legs also constituting supporting legs for the inner ends of the body members when they are adjusted to a horizontal position, the adjacent legs being offset relative to each other to permit them to overlap when the body members are adjusted to horizontal position.

8. In a combined grill and grate or grid the combination of a pair of trough shaped body members having grid-like walls, said body members being hingedly connected at their inner ends to permit their being adjusted to facing upright relation to constitute a fuel basket or to an aligned horizontal position to constitute a grate or grid, adjustable transverse members mounted on said body members to be positioned at the inner ends of the body members to constitute fuel basket bottom members when the body members are adjusted to upright position or to be positioned on the body members to constitute end members when the body members are adjusted to a horizontal position, and legs at the inner ends of said body members to support them in upright or in horizontal position.

9. In a combined grill and grate or grid the combination of a pair of trough shaped body members having grid-like walls, said body members being hingedly connected at their inner ends to permit their being adjusted to facing upright relation to constitute a fuel basket or to an aligned horizontal position to constitute a grate or grid, legs at the inner ends of said body members to support them in upright or in horizontal position, and grill supporting arms secured to the body members to project laterally therefrom for supporting grills at the sides thereof when the body members are adjusted to upright position, said arms constituting legs when the body members are adjusted to horizontal position.

10. In a combined grill and grate or grid the combination of a pair of trough shaped body members having grid-like walls, said body members being hingedly connected at their inner ends to permit their being adjusted to facing upright relation to constitute a fuel basket or to an aligned horizontal position to constitute a grate or grid, and legs at the inner ends of said body members and extending downwardly therefrom in laterally offset relation thereto to provide a relatively wide base when the body members are in upright position, the legs also constituting supporting legs for the inner ends of the body members when they are adjusted to a horizontal position, the adjacent legs being offset relative to each other to permit them to overlap when the body members are adjusted to horizontal position.

11. In a combined grill and grate or grid the combination of a pair of open work body members hingedly connected at their inner ends to permit their being adjusted to upright relation to constitute walls of a fuel basket or to an aligned horizontal position to constitute a grate or grid, adjustable transverse members adjustably positionable on said body members to be positioned at the inner ends thereof to constitute bottom members when the body members are adjusted to upright position or to be positioned on the body members to constitute end members when the body members are adjusted to a horizontal position, legs at the inner ends of said body members to support them in upright position or in horizontal position, and grill supporting arms secured to said body members to project laterally therefrom for supporting grills at the sides thereof when the body members are adjusted to upright position, said arms constituting legs when the body members are adjusted to horizontal position.

12. In a combined grill and grate or grid the combination of a pair of open work body members hingedly connected at their inner ends to permit their being adjusted to upright relation to constitute walls of a fuel basket or to an aligned horizontal position to constitute a grate or grid, legs at the inner ends of said body members adapted to support them in upright position or to support their inner ends in horizontal position when the members are adjusted to a horizontal position, and grill supporting arms secured to said body members to project laterally therefrom for supporting grills at the sides thereof when the body members are adjusted to upright position, said arms constituting legs coacting with the legs at the inner ends of the body members to support the body members when they are adjusted to horizontal position.

13. In a combined grill and grate or grid the combination of a pair of open work body members hingedly connected at their inner ends to permit their being adjusted to upright relation to constitute walls of a fuel basket or to an aligned horizontal position to constitute a grate or grid, adjustable transverse members adjustably positionable on said body members to be positioned at the inner ends thereof to constitute bottom members when the body members are adjusted to upright position or to be adjusted longitudinally of the body members to constitute end members when the body members are adjusted to a horizontal position, and legs at the inner ends of said body members to support them in upright position or in horizontal position.

14. In a combined grill and grate or grid, the combination of a pair of openwork body members of generally channel shape in transverse section hingedly connected at their inner ends to permit adjustment thereof to an upright facing relation to constitute a fuel basket or to an aligned complementary horizontal position to constitute a grate or grid, and legs fixedly secured to the inner ends of said body members to swing therewith when the body members are adjusted on their hinge connections and projecting downwardly therefrom in both of said positions of adjustment, the legs being laterally positioned relative to the hinge connections to said body members so that when the body members are adjusted to their upright fuel basket constituting position the weight of the body members and the fuel therein acts to maintain the body members in their fuel basket relation to each other, the legs also supporting the inner ends of the body members when they are adjusted to their aligned horizontal grate or grid constituting position, the body members having fixed elements projecting laterally from their outer ends and constituting legs therefor when they are adjusted to such horizontal position.

MAHLON J. SMITH.

REFERENCES CITED

The following references are of record in the file of this patent:

UNITED STATES PATENTS

| Number | Name | Date |
|---|---|---|
| 969,495 | Rape | Sept. 6, 1910 |
| 1,095,970 | Stopple | May 5, 1914 |
| 1,337,043 | Child | Apr. 13, 1920 |
| 2,048,769 | Anderson | July 28, 1936 |
| 2,154,165 | Huntington | Apr. 11, 1939 |
| 2,335,217 | Tate | Nov. 23, 1943 |
| 2,376,640 | Wall et al. | May 22, 1945 |
| 2,408,935 | Kunst | Oct. 8, 1946 |
| 2,419,344 | Eggleston | Apr. 22, 1947 |
| 2,456,397 | Gallichio et al. | Dec. 14, 1948 |